R. W. TAVENER.
Faucet.
No. 212,283.  Patented Feb. 11, 1879.
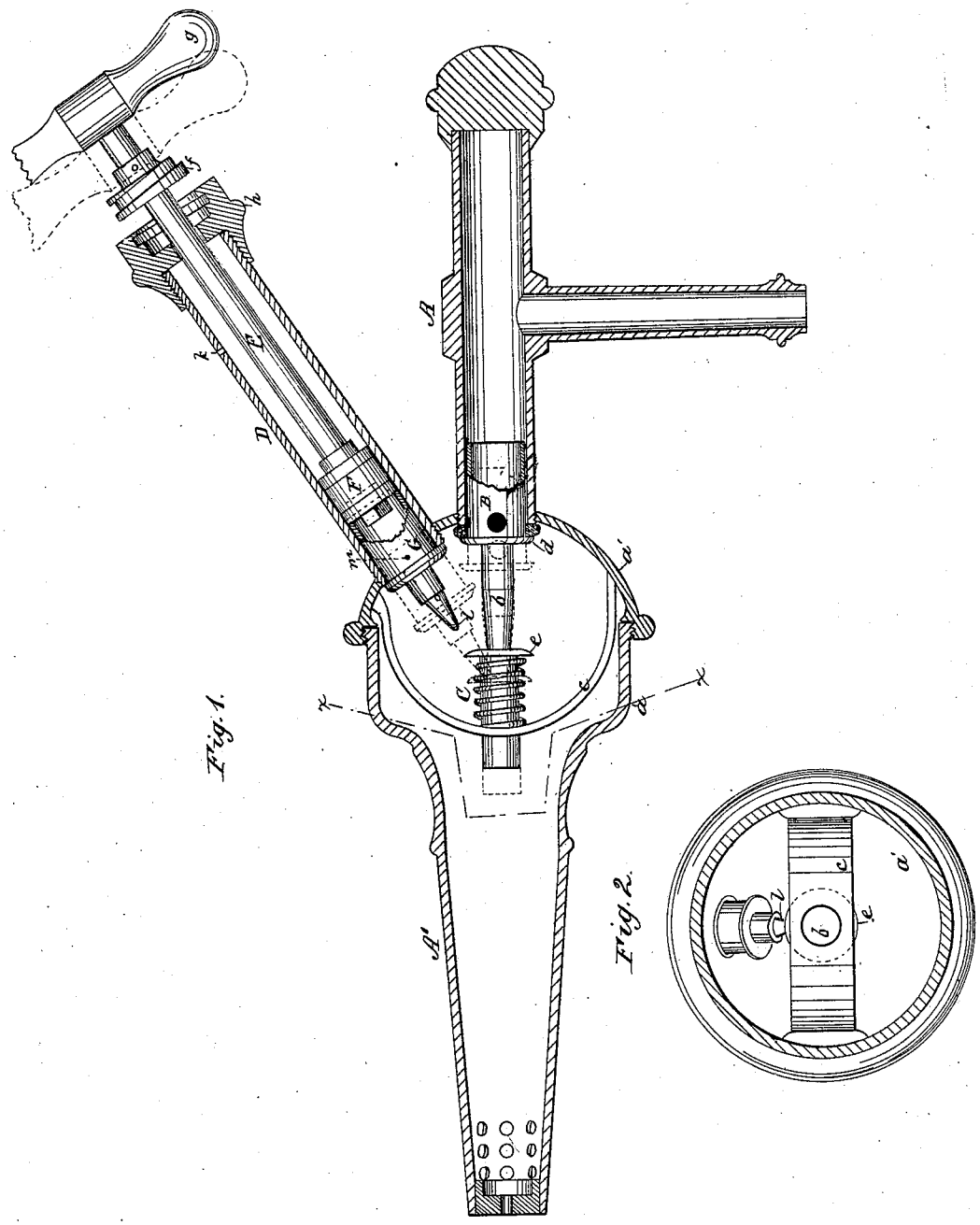
WITNESSES:
W. W. Hollingsworth
Amos W. Hart
INVENTOR:
Robt. W. Tavener
BY
ATTORNEYS.

UNITED STATES PATENT OFFICE.

ROBERT W. TAVENER, OF WEST BAY CITY, MICHIGAN, ASSIGNOR TO HENRY H. NORRINGTON, OF SAME PLACE.

IMPROVEMENT IN FAUCETS.

Specification forming part of Letters Patent No. 212,283, dated February 11, 1879; application filed December 20, 1878.

*To all whom it may concern:*

Be it known that I, ROBERT W. TAVENER, of West Bay City, in the county of Bay and State of Michigan, have invented a new and useful Improvement in Faucets; and I do hereby declare that the following is a full, clear, and exact description of the same.

The object of my invention is to produce an improved beer-faucet which shall be so constructed that the operation of a single handle or lever shall cause escape of beer and admission of air simultaneously, or which may be used independently as a beer-drawing or air-forcing pump, or as an air-vent, as occasion requires.

In carrying out my invention practically, I provide the faucet-barrel with an attachment consisting of a tube, a piston, and an air-valve, and I construct the liquid-valve (or valve which is located in the barrel) in such a manner that the air-valve may be made to come in contact with it when the piston is forced in, and thereby open the said valve to permit escape of the liquid contained in the cask. The piston may, however, be so operated as to allow air to enter the cask through the valve without also permitting escape of liquid.

In the accompanying drawings, forming part of this specification, Figure 1 is a longitudinal central section of my improved faucet. Fig. 2 is a cross-section on line $x\ x$ of Fig. 1.

A A' indicate the two detachable parts of the faucet-barrel. The part A is the driving end, and has a solid conical head. The part A' is tapered and provided with perforations for passage of liquid. The inner ends of the respective parts have hollow hemispherical or bell-shaped enlargements $a\ a'$, which are united by a screw-joint, and thereby adapted for convenient connection and disconnection.

The hollow cylindrical valve B, which controls escape of liquid, is seated in the inner end of the part A, and provided with a stem, $b$, which works in a curved transverse bar, $c$, attached to the sides of the bell $a$. A shoulder, $d$, limits the forward movement of the valve, and the latter is held to its seat by a spiral spring, C, which encircles the valve-stem, and is interposed between the bar $c$ and a circular flange, $e$. When the valve is forced back, (by means which will be presently described,) the openings in the valve are exposed and the liquid allowed to escape through them. When the valve is released, the resiliency of the spring closes it again, and thus cuts off the discharge.

A tube, D, is screwed into or otherwise attached to the upper side of the hemispherical part $a$ of the barrel, and arranged at an acute angle with the nozzle or discharge-tube A. The rod E of piston F, which works in said tube, has an enlargement, $f$, contiguous to the handle $g$, and on it is formed a single spiral or screw-thread. This nut $f$ screws into a corresponding socket, $h$, attached to the end of the tube D. The piston F has a screw-nut, whose adjustment forces out the packing, and causes it to fit the tube so as to form an air-tight joint. An air-opening, $k$, is formed in the tube near its upper end. A hollow cylindrical air-valve, G, is fitted in the lower end of the tube, and provided with a conical downward extension or arm, $l$. An air-opening, $m$, is formed in the side of the valve.

When the piston-rod E is forced down into the position shown in full lines, Fig. 1, the piston comes in contact with the valve G and pushes it downward, so that air will pass through vent $m$ into the cask. By screwing the nut into its socket, the point or extension $l$ of valve G is forced against the flange of the valve-stem, as shown in dotted lines, Fig. 1, and thus forces back the valve and allows the discharge of the liquid contained in the cask. The movable parts—piston, air-valve, and liquid-valve—are held locked in this position by engagement of the nut with its socket; and, obviously, upon turning the piston-rod back to the left, the piston will recede from the air-valve G, and the latter be forced back to its seat by pressure of the liquid in the faucet-barrel, thus allowing the spring to close valve D. If the piston be drawn up past opening $k$ in the tube D, and then forced down, the air which fills the body of the tube between such opening and valve G will be forced into the cask. The device thus operates as an air-forcing pump.

It will be perceived that by the construction and arrangement above described a single movement or manipulation of the piston-rod will effect the discharge.

I may, in some cases, dispense with the air-valve G, and provide the piston with an extension or arm, or else provide the valve B with an extension or arm which shall enable the piston to open the valve without the intermediation of the air-valve.

What I claim is—

1. The combination, substantially as described, of the faucet-barrel, the pump cylinder or tube D, connected therewith, the piston, an air-valve, and the liquid-valve having a projection or flange on its stem, whereby said piston may be operated to admit air and effect discharge of liquid simultaneously, as specified.

2. The combination of pump-cylinder, piston and rod, and the liquid-valve having a projection or arm with which the piston (or the intermediate air-valve, when the latter is used) may come in contact, and the faucet-barrel, substantially as shown and described.

3. The combination of pump-cylinder, piston and rod, the air-valve G, liquid-valve B, the spring C, and stem $b$, guide-bar $c$, and the faucet-barrel A A', substantially as shown and described.

4. The combination of tube D, having air-opening $k$, and valve G, having air-opening $m$, the piston F, and the faucet-barrel, substantially as shown and described.

5. The combination, with liquid-valve B and the faucet-barrel A, of the pump-cylinder having socket $h$, the piston, the piston-rod, and its handle provided with screw-threaded enlargement $f$, all as shown and described, whereby the liquid-valve may be locked open, as specified.

ROBERT WILLIAM TAVENER.

Witnesses:
H. M. GILLETT,
JOHN E. SIMONSON.